(12) United States Patent
Chang

(10) Patent No.: US 7,060,195 B2
(45) Date of Patent: Jun. 13, 2006

(54) METHOD FOR FORMING A LIQUID CRYSTAL DISPLAY PANEL

(75) Inventor: Lu-Kuen Chang, Chia-Yi Hsien (TW)

(73) Assignee: Quanta Display Inc., Tao-Yuan Hsien (TW)

( * ) Notice: Subject to any disclaimer, the term of this patent is extended or adjusted under 35 U.S.C. 154(b) by 326 days.

(21) Appl. No.: 10/249,490

(22) Filed: Apr. 14, 2003

(65) Prior Publication Data
US 2004/0159630 A1    Aug. 19, 2004

(30) Foreign Application Priority Data
Feb. 14, 2003   (TW) ............................... 92103164 A

(51) Int. Cl.
*B30B 33/00* (2006.01)
(52) U.S. Cl. ............................ 216/23; 216/13; 216/41; 438/30
(58) Field of Classification Search .................. 216/23, 216/41, 58, 67, 83, 102; 438/30, 689, 735, 438/737, 745, 754
See application file for complete search history.

(56) References Cited

U.S. PATENT DOCUMENTS

| 5,828,433 | A | * | 10/1998 | Shin | 349/147 |
| 5,982,467 | A | * | 11/1999 | Lee | 349/138 |
| 6,184,948 | B1 | * | 2/2001 | Lee | 349/54 |
| 6,400,425 | B1 | * | 6/2002 | Kim et al. | 349/40 |
| 2002/0041347 | A1 | * | 4/2002 | Lee et al. | 349/47 |

* cited by examiner

*Primary Examiner*—Anita Alanko
(74) *Attorney, Agent, or Firm*—Winston Hsu

(57) ABSTRACT

A plurality of scan lines and gate electrodes are formed on a pixel array area of a substrate, and a plurality of bottom pad electrodes are formed on a gate and a source pad area of the substrate. An insulating layer and a plurality of active layers are formed on the substrate. A plurality of signal lines, source/drain electrodes are formed on the pixel array area, and a plurality of top pad electrodes are formed on the gate and the source pad area. A circuit testing process is performed. A passivation layer having via holes is formed on the pixel array area, and a plurality of contact holes are formed in the gate and the source pad area. A patterned transparent conductive layer filling the via holes and the contact holes is formed on the substrate.

35 Claims, 13 Drawing Sheets

METHOD FOR FORMING A LIQUID CRYSTAL DISPLAY PANEL

BACKGROUND OF INVENTION

1. Field of the Invention

The present invention relates to a method for forming a liquid crystal display (LCD) panel, and more specifically, to a method for forming pads of a thin film transistor LCD (TFT-LCD)panel.

2. Description of the Prior Art

The TFT-LCD panel utilizes a matrix of TFTs in conjunction with other electrical elements, such as capacitors and bonding pads, as switches for driving liquid crystal pixels to produce brilliant images. Since the TFT-LCD panel has the; advantages of being lightweight, having low energy consumption, and being free of radiation emission, the TFT-LCD has been widely used in various portable products, such as notebooks, personal digital assistants (PDA), etc., and even has a great potential to replace the conventional CRT monitor.

Basically, the TFT-LCD panel includes a top substrate, a bottom substrate, and liquid crystal materials filled between the top substrate and the bottom substrate. Specifically, the bottom substrate includes a plurality of scan lines, a plurality of signal lines perpendicular to the scan lines, and a plurality of bonding pads electrically connected to corresponding driving integrated circuits (ICs) positioned on the bottom substrate. Furthermore, at least one TFT is positioned at an intersection of each scan line and each signal line, and used as a switch device of a pixel of the LCD panel.

Please refer to FIG. 1 to FIG. 7, which are schematic diagrams illustrating a method for forming a conventional LCD panel 10. FIG. 6 is a cross-sectional view along line I—I of the LCD panel 10 shown in FIG. 5. FIG. 7 is a cross-sectional view along line II—II of the LCD panel 10 shown in FIG. 5. As shown in FIG. 1, a glass substrate 12 with a pixel array area 14, a gate pad area 16, and a source pad area 18 positioned on the glass substrate 12 for forming a plurality of pixels 48, a plurality of gate pads 50, and a plurality of source pads 52 (as shown in FIG. 5) are provided.

As shown in FIG. 2, a first metal layer (not shown in FIG. 2) is deposited on the glass substrate 12, and a first photo-etching-process (PEP) is performed on the first metal layer to form a plurality of parallel scan lines 20 and a plurality of gate electrodes 22 inside the pixel array area 14, a shorting bar 24 inside the gate pad area 16, and a comb-shaped shorting bar 26 inside the source pad area 18 simultaneously. The scan lines 20 extend into the gate pad area 16 and are electrically connected to the shorting bar 24. Specifically, portions of the scan lines 20 positioned inside the gate pad area 16 are used as pad electrodes 28 of the gate pads, and portions of the comb-shaped shorting bar 26 positioned inside the source pad area 18 are used as pad electrodes 38 of the source pads. Typically, the shorting bars 24 and 26 are used to perform a subsequent electrical testing process for checking the scan lines 20 and the signal lines formed later (not shown in FIG. 2). After that, an insulating layer 25 (as shown in FIGS. 6–7) and a doped amorphous silicon layer (not shown in FIG. 2) are sequentially formed on the glass substrate 12, and a second PEP is performed on the doped amorphous silicon layer to form a plurality of active layers 30 covering corresponding gate electrodes 22 inside the pixel array area 14, and remove portions of the doped amorphous silicon layer and the insulating layer 25 outside the pixel array area 14 simultaneously.

Then as shown in FIG. 3, a second metal layer (not shown in FIG. 3) is deposited on the glass substrate 12 after performing the second PEP. Further, a third PEP is performed on the second metal layer to form a plurality of signal lines 32 perpendicular to the scan lines 20, a plurality of source electrodes 34, and a plurality of drain electrodes 36 inside the pixel array area 14. Moreover, each signal line 32 is partially overlapped with an underlying pad electrode 38.

As shown in FIG. 4, a passivation layer 39 (as shown in FIGS. 6–7) is formed on the glass substrate 12. Further, a fourth PEP is performed on the passivation layer 39 to form at least one via hole 40 at each drain electrode 36 of the pixel array area 14, at least one contact hole 42 at an overlapped area of each scan line 32 and each pad electrode 38, and simultaneously remove portions of the passivation layer 39 outside the pixel array area 14. Afterwards, a transparent conductive layer (not shown in FIG. 4), comprising indium tin oxide (ITO), is deposited on the glass substrate 12 to fill the via holes 40 inside the pixel array area 14 and the contact holes 42 inside the source pad area 18. Then, a fifth PEP is performed on the transparent conductive layer to form a patterned transparent conductive layer 44 in each pixel, a plurality of patterned transparent conductive layers 45 above the pad electrodes 28 inside the gate pad area 16, and simultaneously form a plurality of patterned transparent conductive layers 46 above the scan lines 32 and the source pad electrodes 38 inside the source pad area 18. Therefore, each signal line 32 can be electrically connected to the shorting bar 26 due to the patterned transparent conductive layers 46. Thereafter, an electrical testing process, such as a probe method is performed on each scan line 20 and each signal line 32 to ensure the quality and the illumination of the LCD panel 10. First, the probe method utilizes two electrified probes to measure the voltages of two scan lines 20. Then, the measured voltages are divided by an electric current and multiplied by a correcting factor to obtain the sheet resistance of each scan line 20. If the sheet resistance of a certain scan line 20 is much greater than that of other scan lines 20, that probably means the scan line 20 is broken. In addition, the signal lines 32 can be checked by utilizing the probe method as well to ensure the quality of the signal lines 32. As if the broken line problem of the scan lines 20 and the signal lines 32 is too serious, the LCD panel 10 is not usable and has to be abandoned.

Finally, if the LCD panel 10 is perfect after performing the electrical testing process, a subsequent process can be performed as follows. As shown in FIG. 5, the shorting bars 24 and 26 inside the gate pad area 16 and the source pad area 18 are cut by utilizing a laser method or other methods to divide the scan lines 20 and the signal lines 32 from each other, and the method for forming the conventional LCD panel 10 is completed.

The conventional method utilizes five PEPs to form the pixels 48, the gate pads 50,and the source pads 52 both with double-layer structure of the LCD panel 10. However, the source pad electrodes 38 of the conventional LCD panel 10 have utilized the patterned transparent conductive layers 46 to electrically connect the corresponding signal lines 32, as shown in FIG. 7. Therefore, the electrical testing process has to be performed after forming the patterned transparent conductive layers 46, i.e. completing the method for forming the conventional LCD panel 10. But if too many scan lines 20 and signal lines 32 are found to be broken after checking, the LCD panel 10 can not be used, which wastes manpower and material resources, so as to increase the process steps and the production cost. Consequently, in the field of LCD panels, it is a very important issue to check the broken line problem of the scan lines and the signal lines as soon as possible.

SUMMARY OF INVENTION

It is therefore a primary object of the claimed invention to provide a method for forming the LCD panel so as to prevent the scan lines and the signal lines from being broken, and raise the production yield rate, but not increase the process steps of the LCD panel.

It is therefore another object of the claimed invention to provide a method for forming the LCD panel that can check the broken line problem of the scan lines and the signal lines as soon as possible, so as to prevent from increasing the production cost of the LCD panel.

According to the claimed invention, the LCD panel is formed on a substrate that comprises a pixel array area, a gate pad area, and a source pad area positioned on a surface of the substrate for forming a plurality of pixels, a plurality of gate pads, and a plurality of source pads. First, a first metal layer is deposited on the substrate, and a first photo-etching-process (PEP) is performed on the first metal layer to form a plurality of gate electrodes, a plurality of gate bottom pad electrodes, and a plurality of source bottom pad electrodes inside the pixel array area, the gate pad area, and the source pad area. Then, an insulating layer and a doped semiconductor layer are sequentially formed on the substrate, and a second PEP is performed on the doped semiconductor layer to form a plurality of active layers inside the pixel array area, and simultaneously remove portions of the doped semiconductor layer inside the gate pad area and the source pad area. After that, a second metal layer is deposited on the substrate, and a third PEP is performed on the second metal layer to form a plurality of source electrodes and a plurality of drain electrodes inside the pixel array area, and simultaneously form a plurality of gate top pad electrodes and a plurality of source top pad electrodes inside the gate pad area and the source pad area. Further, a passivation layer is formed on the substrate, and a fourth PEP is performed on the passivation layer to form a plurality of via holes inside the pixel array area, and simultaneously remove portions of the passivation layer inside the pixel array area. Afterwards, a plurality of contact holes are formed inside the gate pad area and the source pad area. Finally, a transparent conductive layer is formed on the substrate to fill the via holes inside the pixel array area and the contact holes inside the gate pad area and the source pad area, and a fifth PEP is performed to define patterns of the transparent conductive layer.

Since the claimed invention utilizes five PEPs as well the conventional method to form the gate pads and the source pads, and the gate pads and the source pads both has a triple-layer structure, driving integrated circuits (ICs) can be easily formed on the pads. Furthermore, the signal lines of the claimed invention do not utilize the transparent conductive layer formed later to electrically connect to the corresponding source pad electrode. Therefore, the electrical testing process of the claimed invention can be performed after forming the signal lines to measure the sheet resistance and check the broken line problem of each scan line and each signal line. Consequently, the claimed invention can detect the broken line problem earlier than the conventional method to reduce the waste of the steps performed later.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
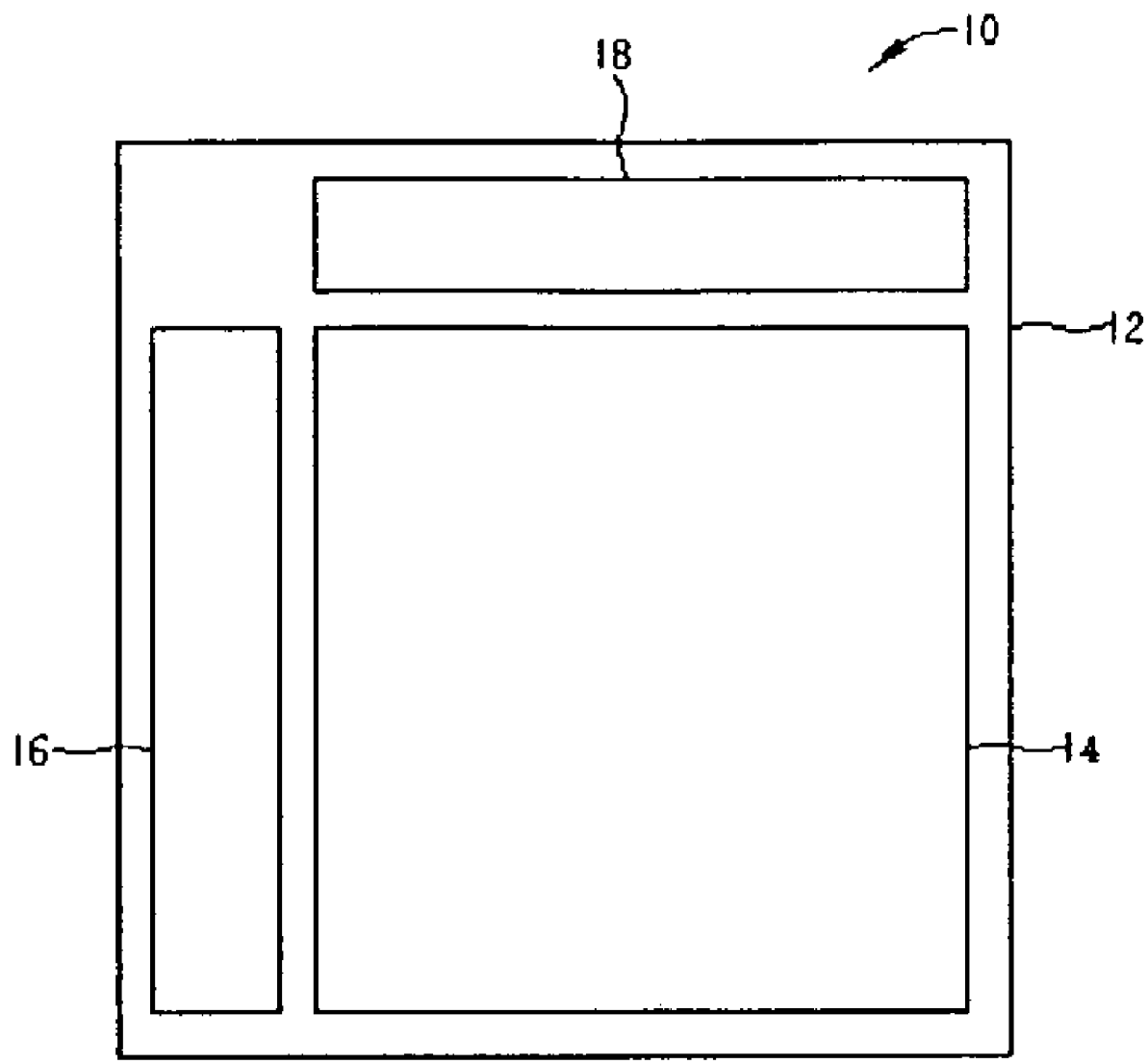
FIG. 1 to FIG. 7 are schematic diagrams illustrating a method for forming a conventional LCD panel.
Figure 2:
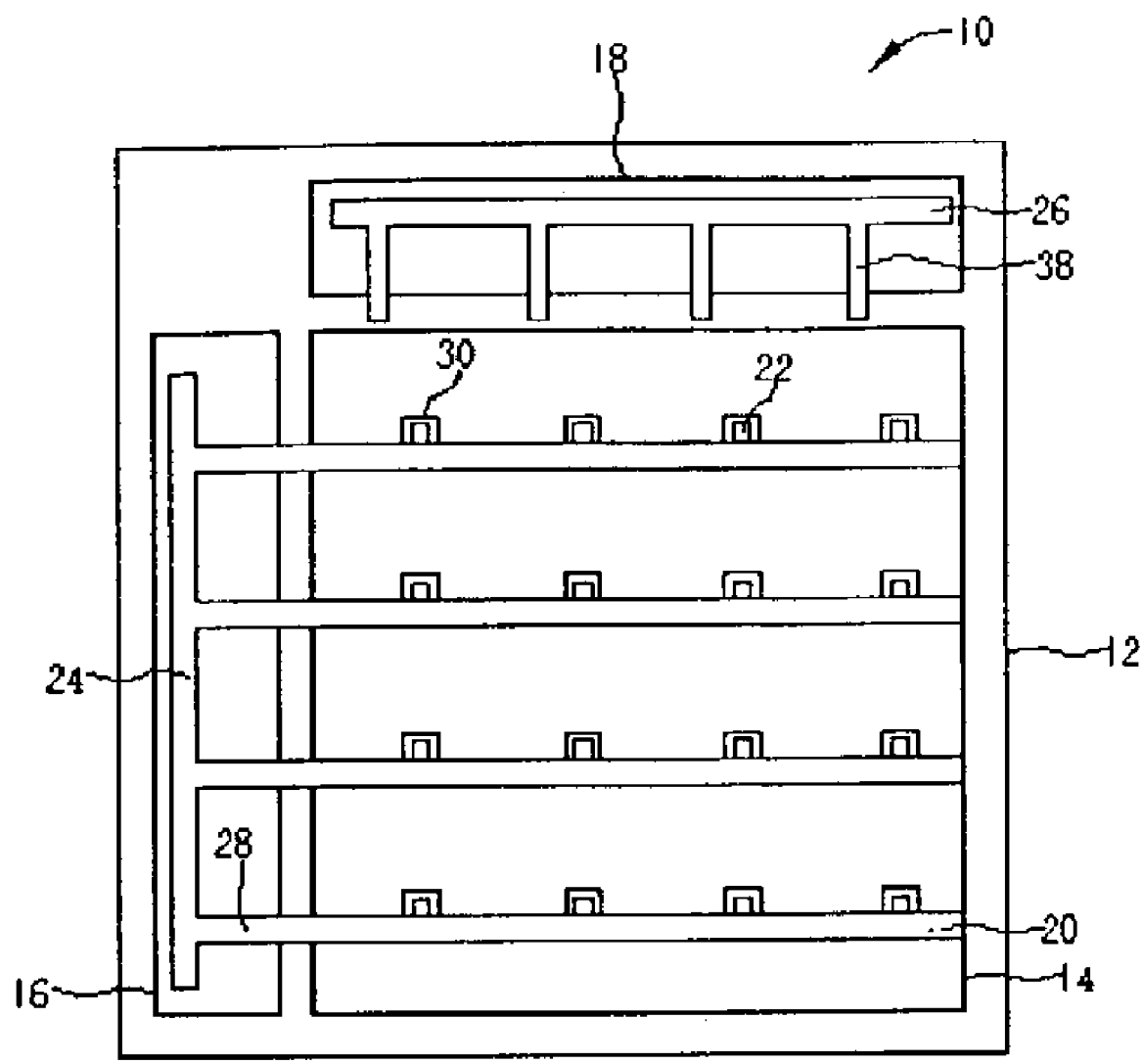
Figure 3:
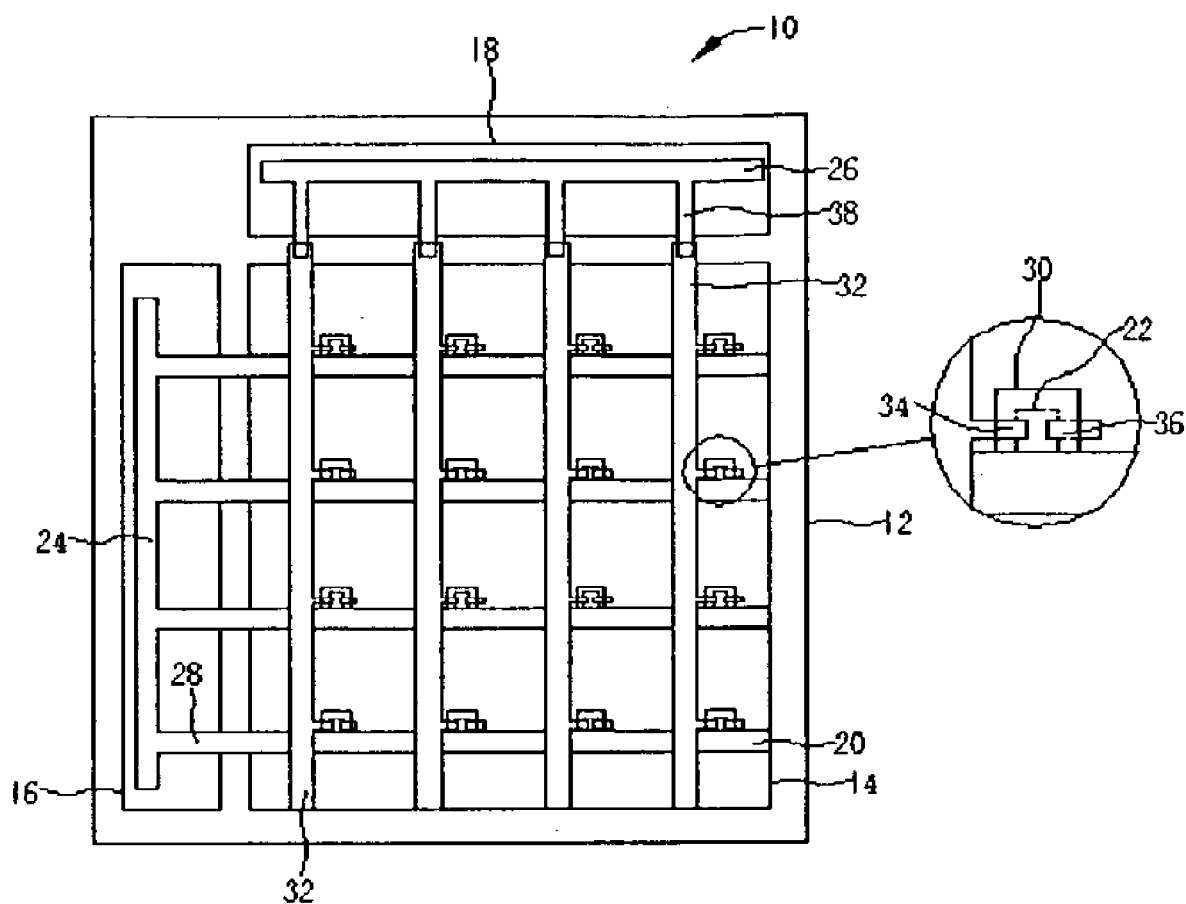
Figure 4:
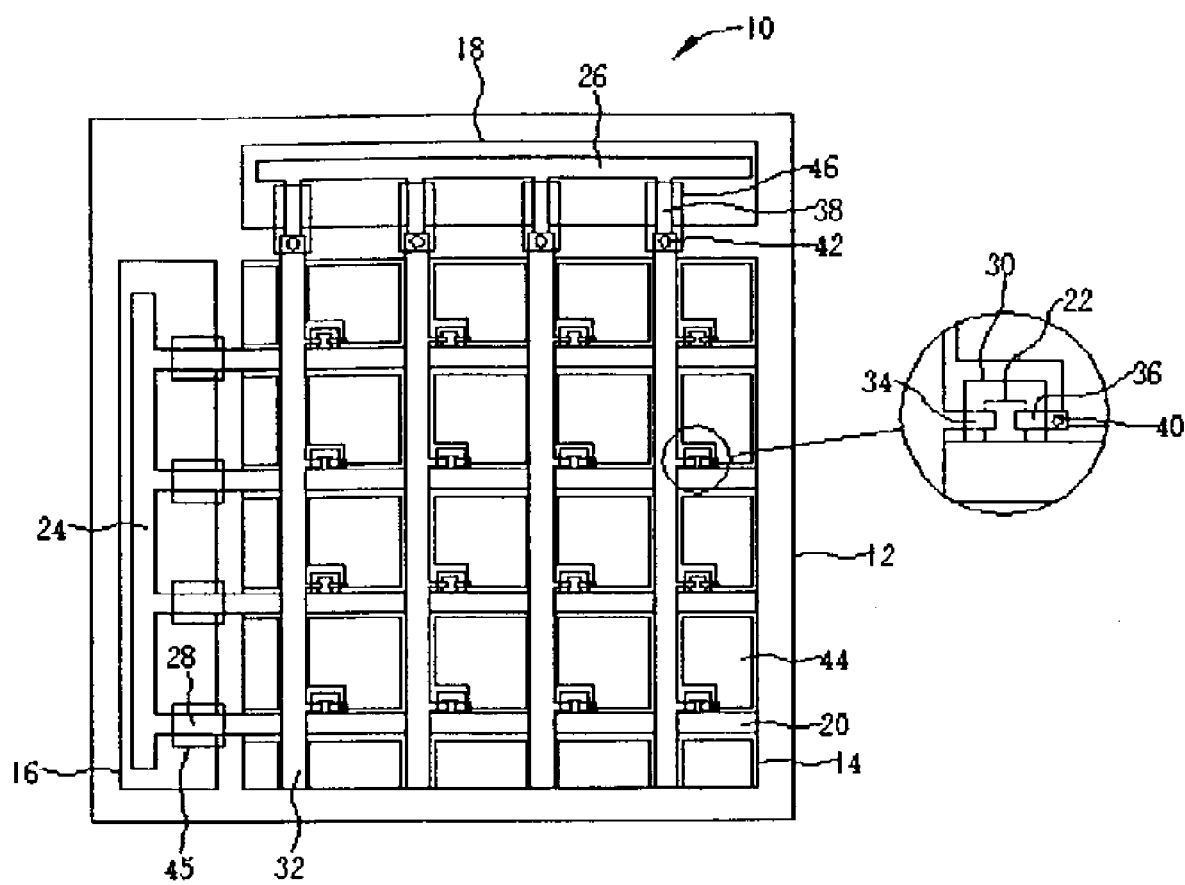
Figure 5:
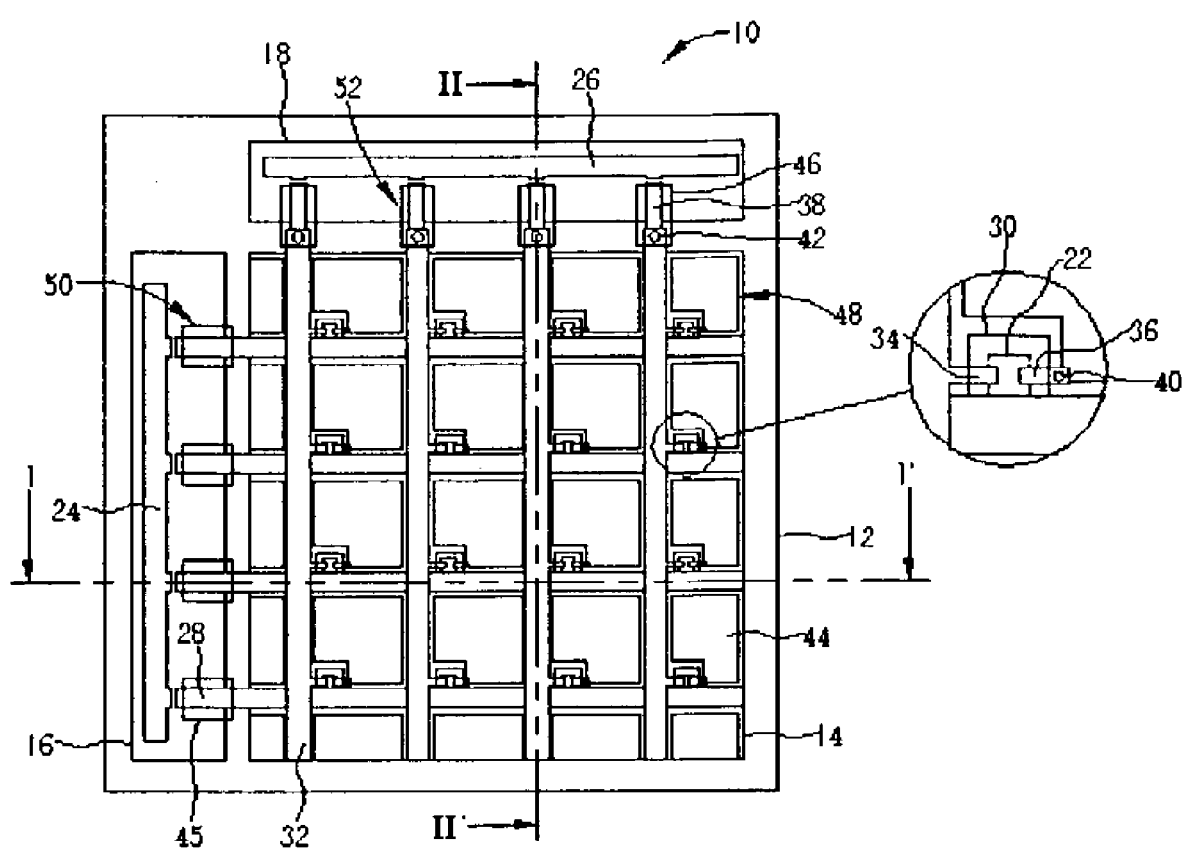
Figure 6:
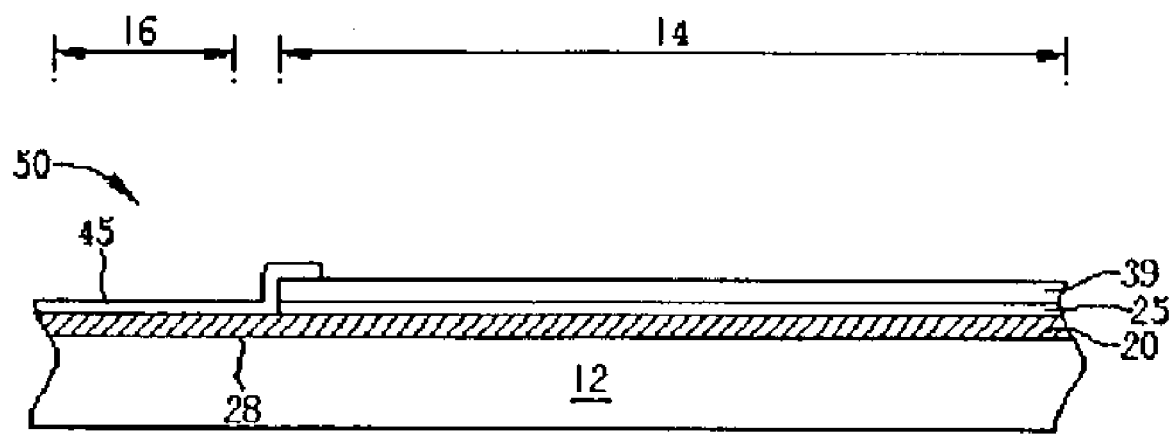
Figure 7:
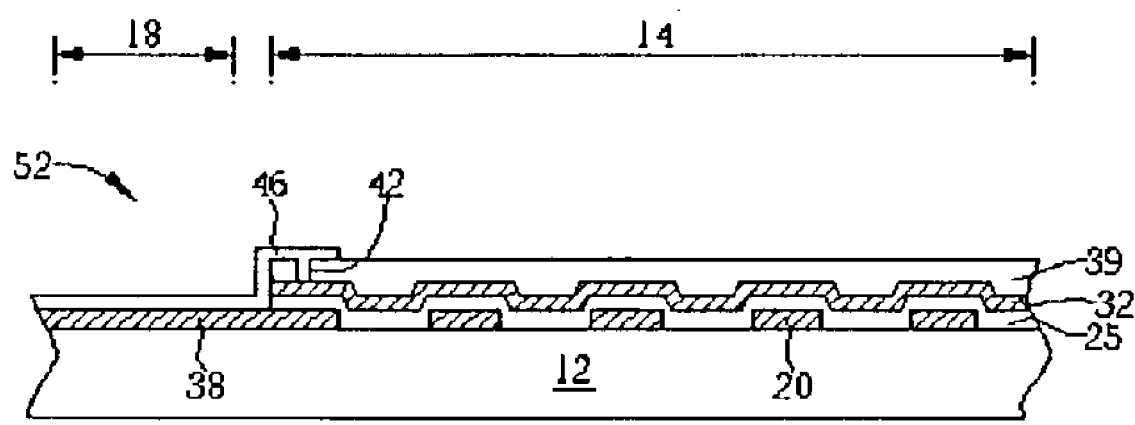
Figure 8:
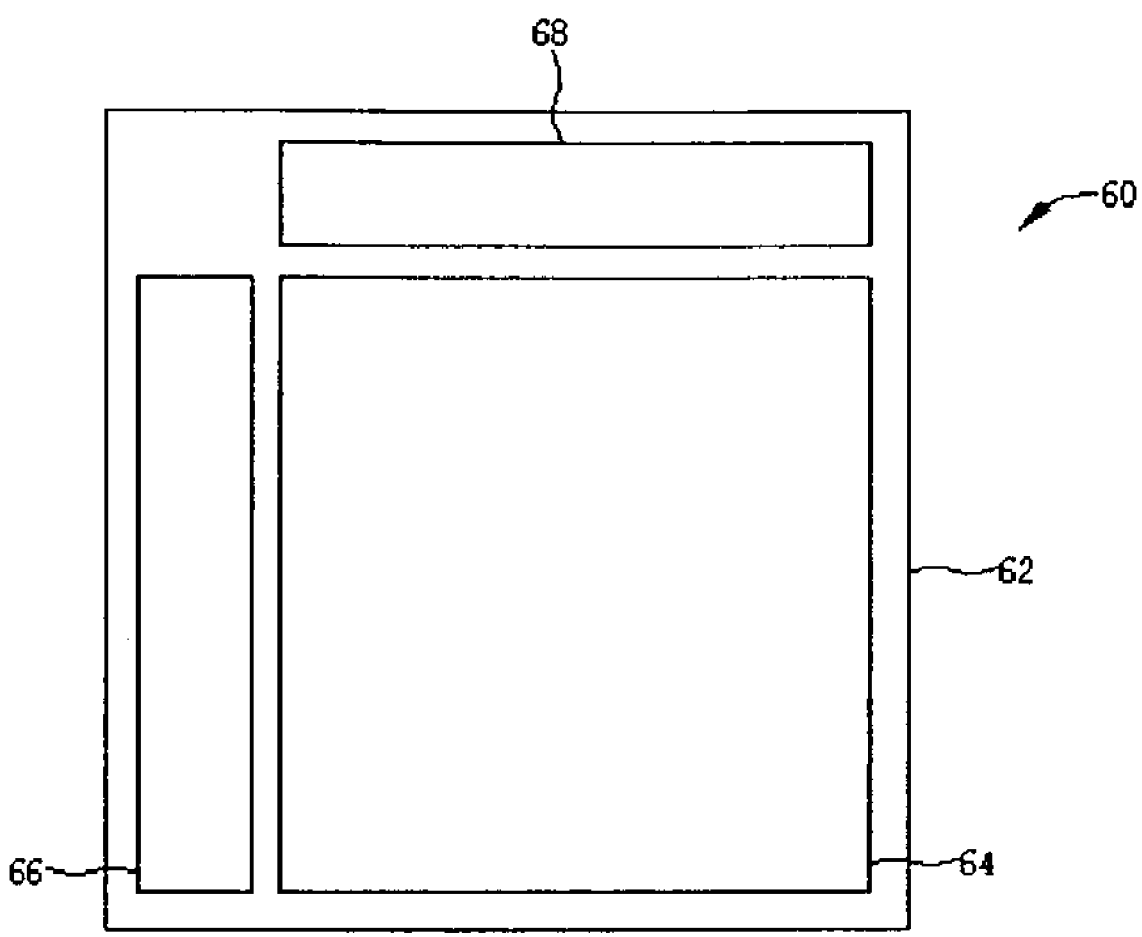
FIG. 8 are FIG. 13 are schematic diagrams illustrating a method for forming an LCD panel according to the present invention.
Figure 10:
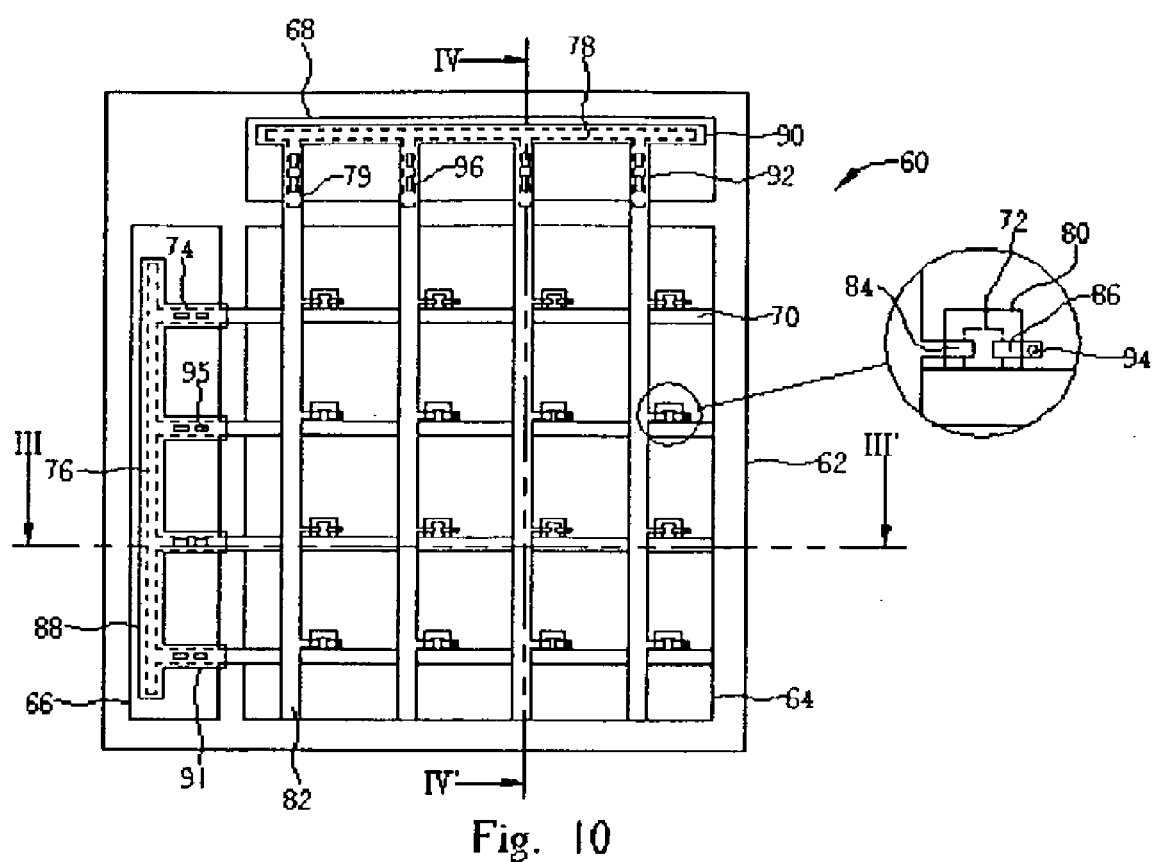
Figure 11:
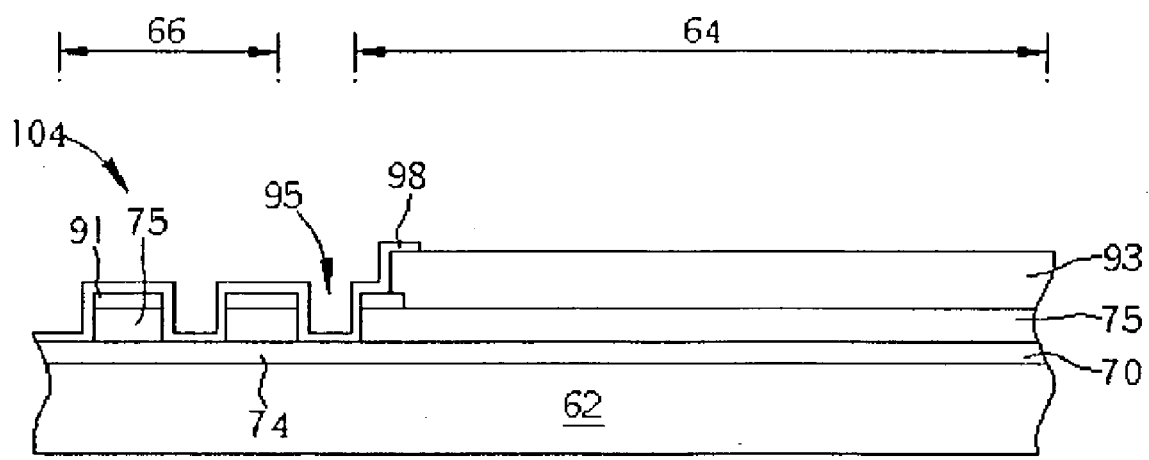
Figure 12:
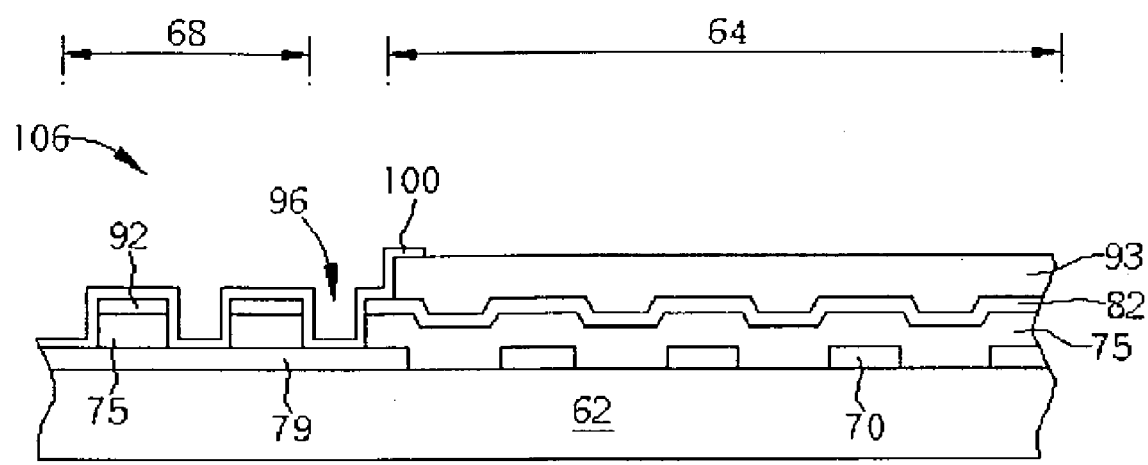

In a preferred embodiment of the present invention, a TFT-LCD panel with a bottom gate low temperature poly-silicon (LTPS) TFT formed inside each pixel of the TFT-LCD panel is utilized as an example to explain the present invention. However, the present invention is not limited in this, various types of display panels, such as a TFT-LCD panel with a top gate LTPS TFT can be utilized in the present invention. Please refer to FIG. 8 to FIG. 13, which are schematic diagrams illustrating a method for forming an LCD panel 60 according to the present invention. FIG. 11 is a cross-sectional view along line III—III of the LCD panel 60 shown in FIG. 10. FIG. 12 is a cross-sectional view along line IV—IV of the LCD panel 60 shown in FIG. 10. As shown in FIG. 8, the LCD panel 60 is formed on a substrate 62 with a pixel array area 64, a gate pad area 66, and a source pad area 68 positioned on a surface of the substrate 62 for forming a plurality of pixels 64, a plurality of gate pads 104, and a plurality of source pads 106 (as shown in FIGS. 10–12). Typically, the substrate 62 comprises either one of a glass substrate, a quartz substrate, or a plastic substrate. The gate pads 104 are used to electrically connect to a gate driving IC, and the source pads 106 are used to electrically connect to a source driving IC.

Figure 9:
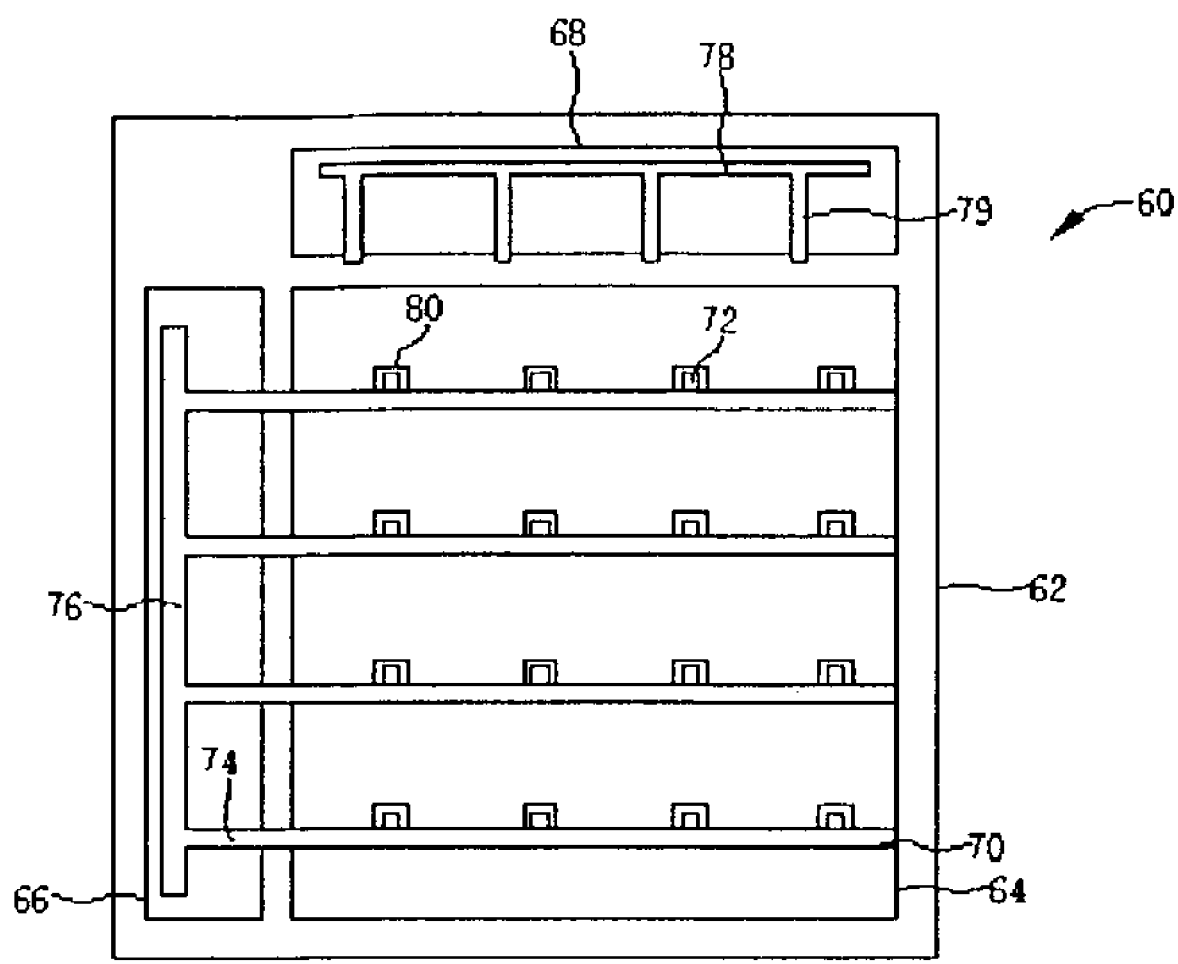

As shown in FIG. 9, at the beginning of the method, a metal layer (not shown in FIG. 9) is deposited on the substrate 62, and a first PEP is performed on the metal layer to form a plurality of parallel scan lines 70 and a plurality of gate electrodes 72 inside the pixel array area 64 of the substrate 62, a shorting bar 76 inside the gate pad area 66, and a comb-shaped shorting bar 78 inside the source pad area 68, simultaneously. All of the scan lines 70 extend into the gate pad area 66 and are electrically connected to the shorting bar 76. Specifically, portions of the scan lines 70 positioned inside the gate pad area 66 are used as gate bottom pad electrodes 74 of the gate pads, and portions of the comb-shaped shorting bar 78 positioned inside the source pad area 68 are used as source bottom pad electrodes 79 of the source pads. Typically, the shorting bars 76 and 78 are used to perform a subsequent electrical testing process for checking the scan lines 70 and the signal lines formed later (not shown in FIG. 9). After that, an insulating layer 75 (as shown in FIGS. 11–12) and a doped amorphous silicon layer (not shown in FIG. 9) are sequentially formed on the substrate 62, and a second PEP is performed on the doped amorphous silicon layer to form a plurality of active layers 80 covering corresponding gate electrodes 72 inside the pixel array area 64, and remove portions of the doped amorphous silicon layer outside the pixel array area 64 simultaneously.

As shown in FIG. 10, another metal layer (not shown in FIG. 10) is deposited on the substrate 62, and a third PEP is performed on the metal layer to form a plurality of signal lines 82 perpendicular to the scan lines 70, a plurality of source electrodes 84, and a plurality of drain electrodes 86 inside the pixel array area 64 of the substrate 62, a comb-shaped structure 88 partially overlapped with the underlying gate bottom pad electrodes 74 and the shorting bar 76 inside the gate pad area 66, and a comb-shaped structure 90 partially overlapped with the underlying shorting bar 78 and the source bottom pad electrodes 79 inside the source pad area 68 simultaneously. All of the signal lines 82 extend into the source pad area 68 and are electrically connected to the comb-shaped structure 90. Specifically, portions of the comb-structure 90 covering the source bottom pad electrodes 79 are used as source top pad electrodes 92 of the source pads, and portions of the comb-shaped structure 88 covering the gate bottom pad electrodes 74 are used as gate top pad electrodes 91 of the gate pads.

Generally, the two metal layers used to form the scan lines 70 and the signal lines 82 can be either a single-metal structure, such as comprising tungsten (W), chromium (Cr), copper (Cu), or molybdenum (Mo); a double-metal structure, such as comprising aluminum (Al) covering titanium (Al/Ti), aluminum covering chromium (Al/Cr), aluminum covering molybdenum (Al/Mo), aluminum neodymium covering molybdenum (AlNd/Mo), aluminum covering tungsten molybdenum (Al/MoW), or aluminum neodymium covering tungsten molybdenum (AlNd/MoW); or a triple-metal structure, such as comprising molybdenum/aluminum/molybdenum (Mo/Al/Mo) or titanium/aluminum/titanium (Ti/Al/Ti). The insulating layer 75 comprises silicon oxide ($SiO_x$), silicon nitride ($SiN_y$), or silicon oxynitride (SiON), and the doped semiconductor layer comprises doped amorphous silicon or doped polysilicon that depends on the parameters of the method for forming the LCD panel 60 of the present invention.

Thereafter, an electrical testing process, such as a probe process, is performed on the scan lines 70 and the signal lines 82 to check the broken line problem of the scan lines 70 and the signal lines 82. If too many of the scan lines 70 and the signal lines 82 are broken, the LCD panel 60 is not usable, and the subsequent steps for forming the LCD panel 60 do not have to be performed.

Figure 13:
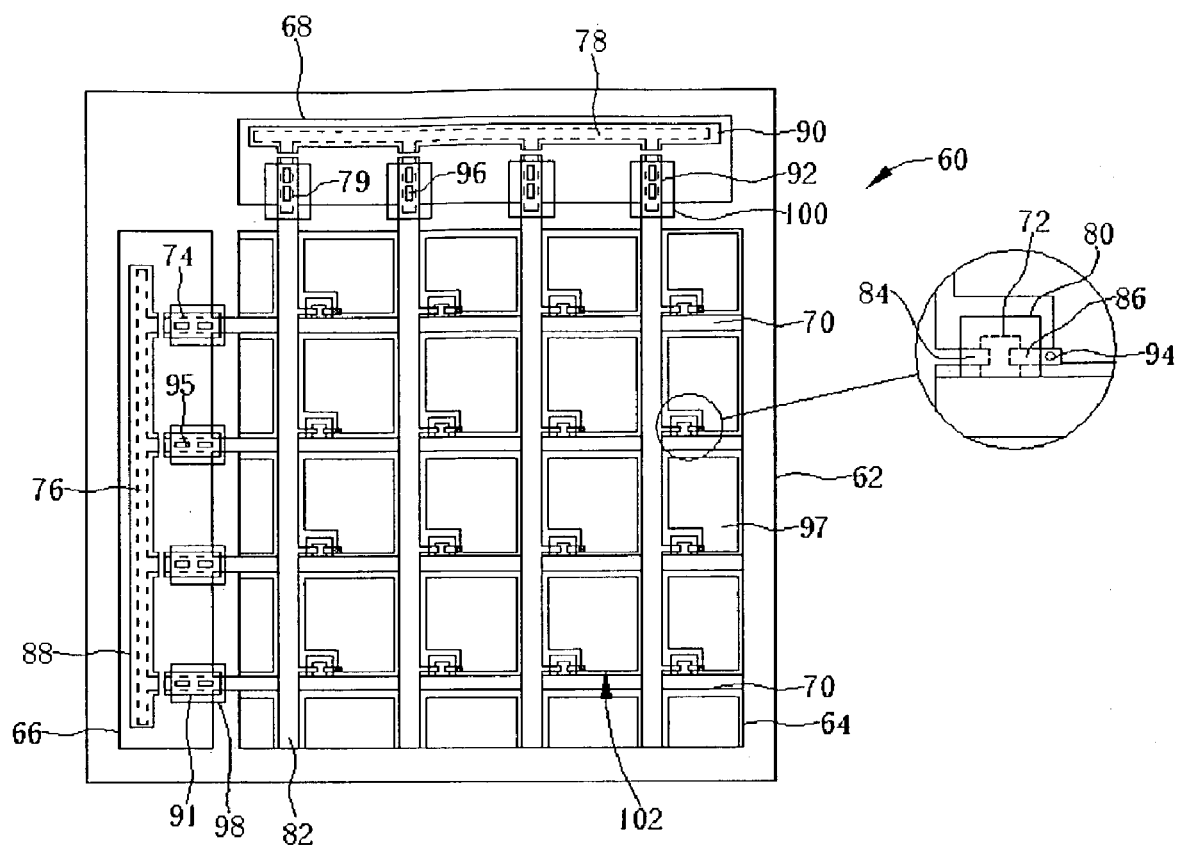

Then as shown in FIGS. 11–12, a passivation layer 93, comprising silicon oxide or silicon nitride, is formed on the substrate 62 after performing the third PEP. Further, a fourth PEP is performed on the passivation layer 93 to form a plurality of via holes 94 (as shown in FIG. 10) at the drain electrodes 86 inside the pixel array area 64, and a plurality of contact holes 95 and 96 inside the gate pad area 66 and the source pad area 68, respectively, and remove portions of the passivation layer 93 outside the pixel array area 64, simultaneously. Thereafter, a transparent conductive layer (not shown in FIGS. 11–12), comprising indium tin oxide (ITO) or indium zinc oxide (IZO), is deposited on the substrate 62 to fill the via holes 94 inside the pixel array area 64 and the contact holes 95 and 96 inside the gate pad area 66 and the source pad area 68. A fifth PEP is performed to form a patterned transparent conductive layer 97 in each pixel, a plurality of patterned transparent conductive layers 98 inside the gate pad area 66, and a plurality of patterned transparent conductive layers 100 inside the source pad area 68, as shown in FIG. 13. Therefore, the transparent conductive layer inside the pixel array area 64, the gate pad area 66, and the source pad area 68 is separated to be a plurality of isolated areas. Finally, a cutting process is performed to divide the shorting bar 78 and the scan lines 70, and the comb-shaped structure 90 and the signal lines 82 so as to separate the scan lines 70 and the signal lines 82 from each other, and the method for forming the LCD panel 60 of the present invention is completed.

In the preferred embodiment of the present invention, the metal layer used to form the signal lines 82, the source electrodes 84, and the drain electrodes 86 utilizes the double-metal structure, such as Al covering Ti (Al/Ti) as an example to explain the present invention. However, Al will produce an electrochemical reaction when Al contacts with the subsequent transparent conductive layer, and this reaction probably influences the electrical performance of the LCD panel. In order to prevent the above-mentioned problem, a wet etching process has to be performed after performing the fourth PEP so as to remove an upper layer (i.e. Al) of the drain electrodes 86 through the via holes 94 inside the pixel array area 64, and simultaneously remove an upper layer (Al) of the gate top pad electrodes 91 and the source top pad electrodes 92 inside the gate pad area 66 and the source pad area 68 through the contact holes 95 and 96, so as to prevent the upper layer (Al) from electrically connecting to the transparent conductive layer formed later. Furthermore, the present invention is not limited in this, if the uppermost layer of the metal layer is not composed of Al, the above-mentioned wet process can be ignored. Moreover, a glue coating process can be performed to prevent Al from being in contact with other electrical devices.

In addition, the electrical testing process is performed after forming the gate top pad electrodes 91 and the source top pad electrodes 92 (i.e. after the third PEP process), and the cutting process of the shorting bars 76 and 78 are performed after performing the fifth PEP in the preferred embodiment of the present invention. However, the cutting process can be performed directly after performing the electrical testing process, or the electrical testing process can be performed after the fifth PEP, and the cutting process is performed later, all depending on the manufacturing process demands.

In comparison with the prior art method, the method discussed in the present invention utilizes five PEPs as well the conventional method to form the pixels 102, the gate pads 104, and the source pads 106 of the LCD panel 60. The gate pads 104 and the source pads 106 both are a triple-layer structure and composed of the transparent conductive layer/ the top pad electrode/the bottom pad electrode, so as to easily form the subsequent driving IC on the bonding pads and increase the electrical performance of the LCD panel. Furthermore, the signal lines 82 of the present invention do not have to utilize the transparent conductive layer to electrically connect to the source pads 106. Therefore, the electrical testing process can be performed after forming the signal lines, so as to check the broken line problems of the scan lines and the signal lines earlier than the conventional method, decrease the production cost, and increase the production yield rate.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A method for forming a liquid crystal display panel (LCD panel), the method comprising:
   providing a substrate, the substrate comprising a pixel array area, a gate pad area, and a source pad area positioned on a surface of the substrate and used for forming a plurality of pixels, a plurality of gate pads, and a plurality of source pads;
   depositing a first metal layer on the substrate;

performing a first photo-etching-process (PEP) on the first metal layer to form a plurality of gate electrodes, a plurality of gate bottom pad electrodes, and a plurality of source bottom pad electrodes inside the pixel array area, the gate pad area, and the source pad area;

sequentially forming an insulating layer and a doped semiconductor layer on the substrate;

performing a second PEP on the doped semiconductor layer to form a plurality of active layers inside the pixel array area, and simultaneously remove portions of the doped semiconductor layer inside the gate pad area and the source pad area;

depositing a second metal layer on the substrate;

performing a third PEP on the second metal layer to form a plurality of source electrodes and a plurality of drain electrodes inside the pixel array area, and simultaneously form a plurality of gate top pad electrodes and a plurality of source top pad electrodes inside the gate pad area and the source pad area, wherein the gate top pad electrodes and the source top pad electrodes are electrically connected to the corresponding gate bottom pad electrodes and the corresponding source bottom pad electrodes respectively for performing an electrical testing process;

forming a passivation layer on the substrate;

performing a fourth PEP on the passivation layer to form a plurality of via holes inside the pixel array area, and simultaneously remove portions of the passivation layer inside the pixel array area;

forming a plurality of contact holes inside the gate pad area and the source pad area;

forming a transparent conductive layer on the substrate to fill the via holes inside the pixel array area and the contact holes inside the gate pad area and the source pad area; and performing a fifth PEP to define patterns of the transparent conductive layer.

2. The method of claim 1 wherein the substrate comprises a glass substrate, a quartz substrate, or a plastic substrate.

3. The method of claim 1 wherein the gate pads are used to electrically connect to a gate driving integrated circuit (IC), and the source pads are used to electrically connect to a source driving IC.

4. The method of claim 1 further comprising forming a plurality of parallel scan lines on the substrate while performing the first PEP on the first metal layer, each scan line extending into the gate pad area and being electrically connected to a corresponding gate bottom pad electrode, and the scan lines being electrically connected with each other.

5. The method of claim 4 further comprising forming a plurality of signal lines on the substrate while performing the third PEP on the second metal layer, the plurality of signal lines being electrically connected with each other and being formed perpendicular to the scan lines, each signal line extending into the source pad area being overlapped partially with an underlying source bottom pad electrode and being electrically connected to a corresponding source top pad electrode, and each gate top pad electrode being overlapped partially with an underlying scan line.

6. The method of claim 5 wherein the scan lines and the signal lines are used to define the pixels, and each pixel comprises a bottom gate low temperature polysilicon silicon thin film transistor (LTPS TFT).

7. The method of claim 5 wherein the electrical testing process is used to detect whether the scan lines and the signal lines are broken or short-circuited.

8. The method of claim 7 further comprising performing a cutting process after performing the electrical testing process for removing an interconnection of the scan lines and the signal lines.

9. The method of claim 1 wherein the first metal layer and the second metal layer are both a single-metal structure, and the first metal layer and the second metal layer both comprise tungsten (W), chromium (Cr), copper (Cu), or molybdenum (Mo).

10. The method of claim 1 wherein the first metal layer and the second metal layer are both a double-metal structure, and the first metal layer and the second metal layer both comprise aluminum (Al) covering titanium (Al/Ti), aluminum covering chromium (Al/Cr), aluminum covering molybdenum (Al/Mo), aluminum neodymium covering molybdenum (AlNd/Mo), aluminum covering tungsten molybdenum (Al/MoW), or aluminum neodymium covering tungsten molybdenum (AlNd/MoW).

11. The method of claim 10 further comprising performing a wet etching process after performing the fourth PEP for removing an upper layer of the second metal layer under the via holes inside the pixel array area, and simultaneously removing an upper layer of the second metal layer of the gate top pad electrodes and the source top pad electrodes so as to prevent the upper layer of the second metal layer from electrically connecting to the transparent conductive layer formed later.

12. The method of claim 1 wherein the first metal layer and the second metal layer are both a triple-metal structure, and the first metal layer and the second metal layer both comprise molybdenum/aluminum/molybdenum (Mo/Al/Mo) or titanium/aluminum/titanium (Ti/Al/Ti).

13. The method of claim 1 wherein the insulating layer comprises silicon oxide ($SiO_x$), silicon nitride ($SiN_y$), or silicon oxynitride (SiON), the doped semiconductor layer comprises doped amorphous silicon or doped polysilicon, the passivation layer comprises silicon oxide or silicon nitride, and the transparent conductive layer comprises indium tin oxide (ITO) or indium zinc oxide (IZO).

14. A method for forming a liquid crystal display panel (LCD panel), the method comprising:

providing a substrate, the substrate comprising a pixel array area, a gate pad area, and a source pad area positioned on a surface of the substrate to respectively form a plurality of pixels, a plurality of gate pads, and a plurality of source pads;

forming a plurality of parallel scan lines on the pixel array area of the substrate, and simultaneously forming a plurality of source bottom pad electrodes on the source pad area of the substrate, each scan line extending into the gate pad area and being electrically connected with each other, and portions of the scan lines positioned inside the gate pad area being used as a plurality of gate bottom pad electrodes;

forming an insulating layer on the substrate;

forming a plurality of signal lines perpendicular to the scan lines on the pixel array area of the substrate, and simultaneously forming a plurality of gate top pad electrodes partially overlapped with an underlying gate bottom pad electrode on the gate pad area of the substrate, each signal line extending into the source pad area and being electrically connected with each other, and portions of the signal lines positioned inside the source pad area being used as a plurality of source top pad electrodes and partially overlapped with an underlying source bottom pad electrode;

forming a plurality of contact holes inside the gate pad area and the source pad area; and forming a patterned transparent conductive layer on the substrate and forming the gate cads having triple structures of transparent conductive layer/gate top pad electrode/gate bottom pad electrode and the source pads having triple structures of transparent conductive layer/gate top pad electrode/gate bottom pad electrode respectively in the rate pad area and the source pad area.

15. The method of claim 14 wherein the substrate comprises a glass substrate, a quartz substrate, or a plastic substrate.

16. The method of claim 14 wherein the gate pads are used to electrically connect to a gate driving integrated circuit (IC).

17. The method of claim 14 wherein the source pads are used to electrically connect to a source driving IC.

18. The method of claim 14 wherein the scan lines and the signal lines are used to define a plurality of pixels inside the pixel array area, and each pixel comprises a bottom gate low temperature polysilicon silicon thin film transistor (LTPS TFT).

19. The method of claim 18 wherein the method for forming the scan lines and the source bottom pad electrodes further comprises steps of:

depositing a first metal layer on the substrate; and performing a first photo-etching-process (PEP) on the first metal layer to form the parallel scan lines inside the pixel array area of the substrate, and simultaneously form the source bottom pad electrodes inside the source pad area of the substrate, each scan line extending into the gate pad area and being electrically connected with each other.

20. The method of claim 19 further comprising forming a gate electrode inside each pixel while performing the first PEP on the first metal layer.

21. The method of claim 20 further comprising forming a patterned doped semiconductor layer on the insulating layer after forming the insulating layer, wherein the patterned doped semiconductor layer comprises doped amorphous silicon or doped polysilicon.

22. The method of claim 21 wherein the method for forming the patterned doped semiconductor layer further comprises steps of:

forming a doped semiconductor layer on the insulating layer; and performing a second PEP on the doped semiconductor layer to form a plurality of active layers inside the pixel array area of the substrate, and simultaneously remove portions of the doped semiconductor layer positioned inside the gate pad area and the source pad area of the substrate.

23. The method of claim 22 wherein the method for forming the signal lines and the gate top pad electrodes further comprises steps of:

depositing a second metal layer on the substrate; and performing a third PEP on the second metal layer to form the signal lines perpendicularly to the scan lines inside the pixel array area of the substrate, and simultaneously form the gate top pad electrodes inside the gate pad area of the substrate, each signal line extending into the source pad area and being electrically connected with each other, each gate top pad electrode being partially overlapped with an underlying gate bottom pad electrode, and each source top pad electrode being partially overlapped with an underlying source bottom pad electrode.

24. The method of claim 23 wherein the first metal layer and the second metal layer are both a single-metal structure, and the first metal layer and the second metal layer both comprise tungsten (W), chromium (Cr), copper (Cu), or molybdenum (Mo).

25. The method of claim 23 wherein the first metal layer and the second metal layer are both a double-metal structure, and the first metal layer and the second metal layer both comprise aluminum (Al) covering titanium (Al/Ti), aluminum covering chromium (Al/Cr), aluminum covering molybdenum (Al/Mo), aluminum neodymium covering molybdenum (AlNd/Mo), aluminum covering tungsten molybdenum (Al/MoW), or aluminum neodymium covering tungsten molybdenum (AlNd/MoW).

26. The method of claim 25 further comprising performing a wet etching process before forming the patterned transparent conductive layer for removing an upper layer of the second metal layer of the gate top pad electrodes and the source top pad electrodes so as to prevent the upper layer of the second metal layer of the gate top pad electrodes and the source top pad electrodes from electrically connecting to the patterned transparent conductive layer formed later.

27. The method of claim 1 wherein the first metal layer and the second metal layer are both a triple-metal structure, and the first metal layer and the second metal layer both comprise molybdenum/aluminum/molybdenum (Mo/Al/Mo) or titanium/aluminum/titanium (Ti/Al/Ti).

28. The method of claim 23 further comprising forming a passivation layer on the substrate before removing the insulating layer, the passivation layer comprising silicon oxide or silicon nitride.

29. The method of claim 28 wherein the method for forming the passivation layer further comprises steps of:

forming a passivation layer on the substrate; and performing a fourth PEP on the passivation layer to form a plurality of via holes inside the pixel array area of the substrate, and simultaneously remove portions of the passivation layer outside the pixel array area of the substrate.

30. The method of claim 29 wherein the method for forming the patterned transparent conductive layer further comprises steps of:

forming a transparent conductive layer on the substrate to fill the via holes inside the pixel array area and the contact holes inside the gate pad area and the source pad area; and performing a fifth PEP to define patterns of the transparent conductive layer for forming the patterned transparent conductive layer.

31. The method of claim 14 wherein the insulating layer comprises silicon oxide ($SiO_x$), silicon nitride ($SiN_y$), or silicon oxynitride (SiON), and the patterned transparent conductive layer comprises indium tin oxide (ITO) or indium zinc oxide (IZO).

32. The method of claim 14 further comprising performing an electrical testing process for detecting if the scan lines and the signal lines are broken or short-circuited.

33. The method of claim 32 wherein the electrical testing process is performed after performing the third PEP.

34. The method of claim 32 wherein the electrical testing process is performed after performing the fifth PEP.

35. The method of claim 32 further comprising performing a cutting process after the electrical testing process for removing an interconnection of the scan lines and the signals.

* * * * *